(12) United States Patent
Kuehl et al.

(10) Patent No.: US 8,911,162 B2
(45) Date of Patent: Dec. 16, 2014

(54) CLAMP ASSEMBLY FOR SCOPE AND CAMERA PHONE MOUNT FOR A WEAPON

(71) Applicant: Benjamin C. Kuehl, Dane, WI (US)

(72) Inventors: Benjamin C. Kuehl, Dane, WI (US); Cody Dulmes, Dane, WI (US); James Walsh, Wauwatosa, WI (US)

(73) Assignee: Benjamin C. Kuehl, Dane, WI (US)

( * ) Notice: Subject to any disclaimer, the term of this patent is extended or adjusted under 35 U.S.C. 154(b) by 0 days.

(21) Appl. No.: 14/270,457

(22) Filed: May 6, 2014

(65) Prior Publication Data

US 2014/0317987 A1    Oct. 30, 2014

Related U.S. Application Data

(63) Continuation-in-part of application No. 14/179,972, filed on Feb. 13, 2014, which is a continuation of application No. 13/782,839, filed on Mar. 1, 2013, now Pat. No. 8,690,460.

(60) Provisional application No. 61/606,093, filed on Mar. 2, 2012.

(51) Int. Cl.
    *G03B 17/48* (2006.01)
    *G02B 21/36* (2006.01)
    *F41C 27/00* (2006.01)
(52) U.S. Cl.
    CPC ....................................... *F41C 27/00* (2013.01)
    USPC ........................................... 396/428; 396/432

(58) Field of Classification Search
    USPC .................................... 396/432, 428; 359/363
    See application file for complete search history.

(56) References Cited

U.S. PATENT DOCUMENTS

| | | | |
|---|---|---|---|
| 3,399,612 A | 9/1968 | Korte | |
| 4,309,095 A * | 1/1982 | Buckley | 396/420 |
| 6,717,727 B2 | 4/2004 | Barziza | |
| 7,128,297 B2 | 10/2006 | Lee | |
| 7,246,956 B2 | 7/2007 | Pernstich et al. | |
| 7,614,805 B2 | 11/2009 | Showalter | |
| 7,922,402 B2 | 4/2011 | Gaertner et al. | |
| 8,690,460 B2 * | 4/2014 | Kuehl et al. | 396/428 |
| 2005/0036782 A1 | 2/2005 | Claudi et al. | |
| 2012/0167437 A1 * | 7/2012 | Holmberg | 42/90 |
| 2013/0111798 A2 | 5/2013 | Russell | |
| 2014/0123532 A1 * | 5/2014 | Russ | 42/113 |
| 2014/0226061 A1 * | 8/2014 | Kuehl et al. | 348/373 |

* cited by examiner

*Primary Examiner* — W B Perkey
(74) *Attorney, Agent, or Firm* — Boardman & Clark LLP

(57) ABSTRACT

A clamp assembly for a scope and camera phone mount is disclosed. In particular, a clamp assembly for a camera phone attachment to a scope of a weapon is provided including a spacer block having a first end coupleable to a camera phone mount and having a recess with first and second flanges that engage a portion of the camera phone mount. The second end of the spacer block has a recess which receives a portion of a weapon scope. A scope securing member is coupled to the spacer block on a first end of the scope securing member by a tongue and groove assembly and on a second end by a thumb screw. The scope securing member receives a portion of the weapon scope.

5 Claims, 20 Drawing Sheets

CLAMP ASSEMBLY FOR SCOPE AND CAMERA PHONE MOUNT FOR A WEAPON

CROSS REFERENCE TO RELATED APPLICATIONS

This application claims priority as a continuation-in-part application to U.S. patent application Ser. No. 14/179,972 filed Feb. 13, 2014, entitled CAMERA PHONE MOUNT FOR A WEAPON SCOPE, which is a continuation application of U.S. patent application Ser. No. 13/782,839 filed Mar. 1, 2013, entitled CAMERA PHONE MOUNT FOR A WEAPON SCOPE, now U.S. Pat. No. 8,690,460, which claims priority to U.S. Provisional Application No. 61/606,093, filed Mar. 2, 2012, entitled CAMERA PHONE MOUNT FOR WEAPONS, the contents of each of which are hereby incorporated by reference in their entirety.

FIELD OF THE INVENTION

The present invention relates to a mounting system for a device having a scope. More specifically, the present invention relates to a mounting a device and associated system for mounting a camera or video recorder to a weapon having a scope.

BACKGROUND

Many hunters desire to take photographs or record videos activates during their hunts. Unfortunately, taking photographs or recordings during the actual hunt can be difficult. One option is to have a second person accompany the hunter for the purpose of taking photographs or recordings of the hunt. However, this is often not practicable, as hunters typically perform a hunt by themselves. In addition, some hunters may not have a second individual who is willing or able to accompany the hunter to take photographs or recordings. While a hunter may hire a person to photograph or record video of the hunt, many hunters will not incur the expense.

Similarly, other users of firearms, weapons, training weapons, or markers, including military personnel, military trainers, or paintball players, who desire to take photographs or record videos of activities involving the respective firearm, weapon, or marker face similar difficulties as hunters.

Some devices are known which attach a photo camera or video camera to the firearm, gun, marker, or weapon. However, these devices typically require the attachment of a bulky camera or video recorder to the weapon. This can interfere with the operation, use, and feel of the firearm, gun, marker, or weapon.

Accordingly, what is needed is a device which will take photographs or video, can easily mount to a firearm, weapon, or marker, which is not bulky or cumbersome, which will not affect the feel or operation of the firearm, weapon, or marker, and which will not interfere with the use of the firearm, weapon, or marker.

SUMMARY OF THE DESCRIPTION

The present invention provides an improved attachment assembly to allow for a camera or video camera to be attached to the scope of a weapon. More specifically, the present invention provides an improved attachment assembly for the selective attachment of a phone device incorporating a camera and/or video camera to the scope of a weapon. The attachment assembly allows a user to select a desired position of the camera phone to view either through the weapon scope or alongside the weapon scope.

A camera phone attachment assembly for attaching a camera phone to a scope of a weapon is provided. The camera phone attachment assembly includes a camera phone mount having at least one camera phone clamp for the selective retention of a camera phone in the camera phone mount, the camera phone mount rotatably and slidably coupled to a mount bracket. A scope mount assembly is coupled to a portion of a weapon scope, the scope mount assembly being slidably received by a portion of the mount bracket, wherein the camera phone mount is rotatable between a first position and a second position, wherein the first position has a camera lens of the camera phone in alignment the view through the scope, and the second position has the camera lens of the camera phone outside of alignment from the view through the scope.

A camera phone attachment assembly for attaching a camera phone to a weapon scope is also provided. The camera phone attachment assembly includes a camera phone mount rotatably coupled to a first member of a mount bracket to allow the camera phone mount to rotate between at least a first position and a second position, the first position aligning a lens of a camera provided in a camera phone with the view provided through a weapon scope, and the second position aligning the lens of the camera provided in the camera phone outside of the view provided through the weapon scope, the first member of the mount bracket includes an elongated aperture, the camera phone mount slidably connected to the elongated aperture to allow the camera phone mount to selectively slide in a first axis along the elongated aperture. A second member of the mount bracket is connected to the first member of the mount bracket, the second member being perpendicular to the first member, the second member being perpendicular to the elongated aperture. A scope mount clamp assembly is also provided and which engages to a portion of the weapon scope, the scope mount clamp assembly including a mounting portion which engages a portion of the second member of the mount bracket, the second member extending in a second axis parallel to the scope and perpendicular to the first axis.

A clamp assembly for a scope and camera phone mount is also disclosed. In particular, a clamp assembly for a camera phone attachment to a scope of a weapon is provided including a spacer block having a first end coupleable to a camera phone mount and having a recess with first and second flanges that engage a portion of the camera phone mount. The second end of the spacer block has a recess which receives a portion of a weapon scope. A scope securing member is coupled to the spacer block on a first end of the scope securing member by a tongue and groove assembly and on a second end by a thumb screw. The scope securing member receives a portion of the weapon scope.

DETAILED DESCRIPTION

The invention illustrated in the Figures and disclosed herein is generally directed to a camera phone attachment assembly 100 which attaches to a weapon scope 300. It should be appreciated that the Figures provided herein are for illustration and are not to scale.

It should be appreciated that the term "camera phone" is directed to include commercially available phones, such as smart phones, which incorporate cameras able to take still photographs and/or digital video, including but not limited to, an Apple iPhone, a Samsung Galaxy, a Motorola Droid, or other Apple OS, Android OS, or like device. In addition, the term "camera phone" may also include similar devices incorporating cameras able to take still photographs and/or digital video, but which do not incorporate phones, for example, but not limited to, an Apple iPod Touch.

It should be appreciated that the term "weapon" is directed to include a firearm, gun, paintball marker, crossbow, bow, a simulated gun, a spotting scope, a pellet gun, bb guns, laser gun (i.e. for laser tag or for military exercises), or any other device which may incorporate or include a telescopic sight or scope.

Figure 1:
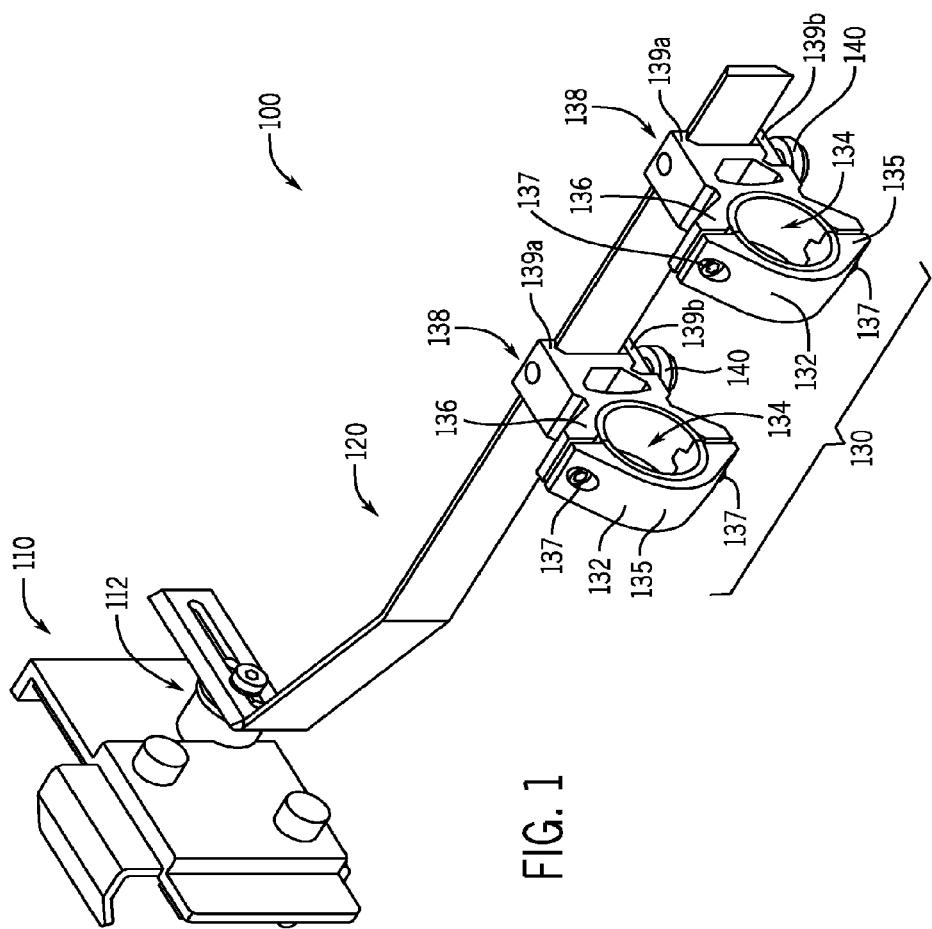
FIG. 1 is an isometric view of one or more examples of embodiments of a camera phone attachment assembly.

Referring now to the Figures, FIG. 1 illustrates one or more examples of embodiments of a camera phone attachment assembly 100. Camera phone attachment assembly may include a universal camera phone mount 110 slidably coupled to a mount bracket 120. Mount bracket 120 may be slidably received by a scope mount clamp assembly 130.

Figure 2:
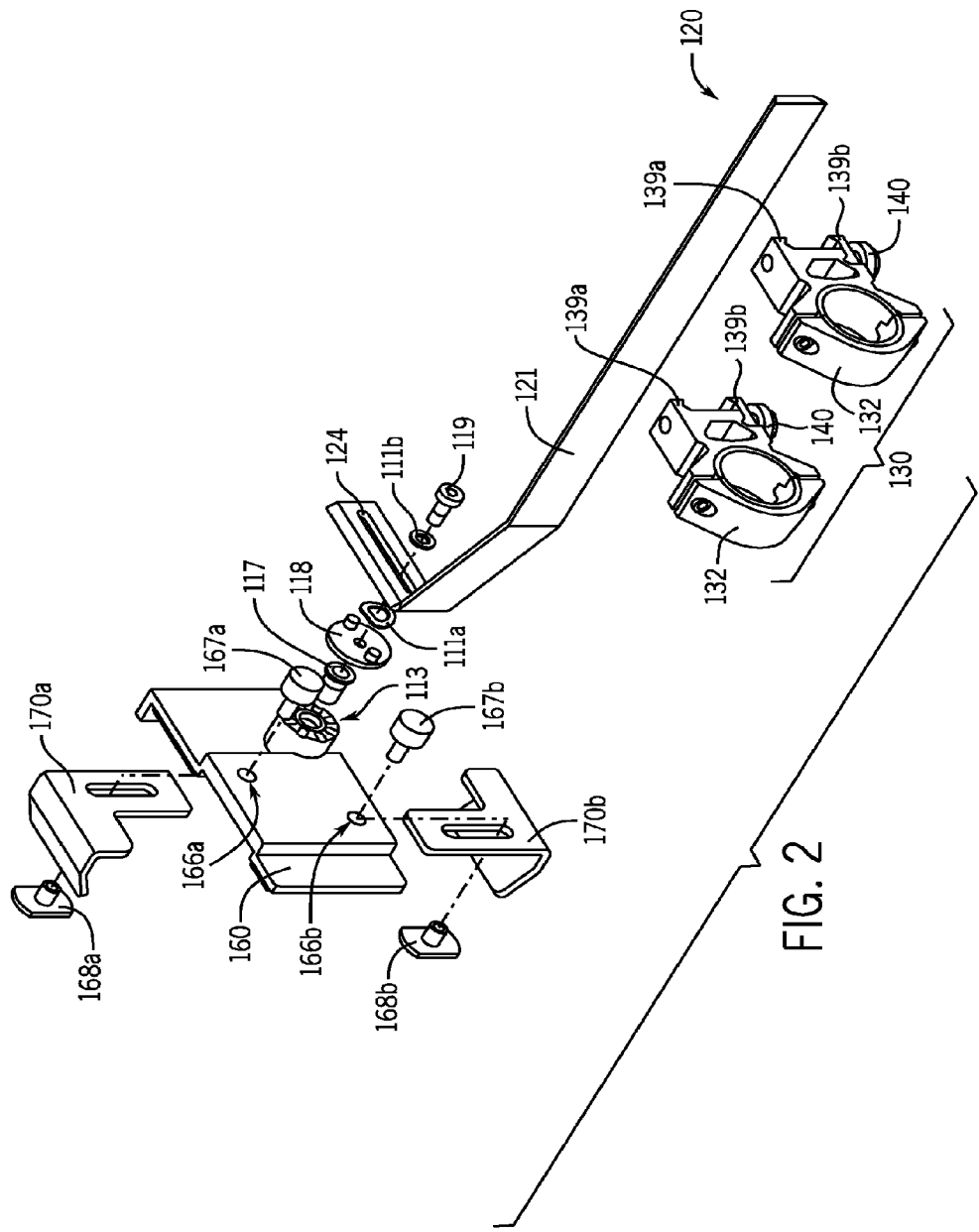
FIG. 2 is an exploded view of the camera phone attachment assembly of FIG. 1.

Referring to FIG. 2, universal camera phone mount 110 may include a camera phone bracket 160. Opposing first and second camera phone clamps 170*a*, 170*b* may be removably and slidably connecting to camera phone bracket 160. The combination of the opposing first and second camera phone clamps 170*a*, 170*b* being slidably connected to camera phone bracket 160 provides for adjustability of the first and second camera phone clamps 170*a*, 170*b*, such that different sized camera phones may be retained by universal camera phone mount 110. This allows the universal camera phone mount 110 to retain almost any length, width, or thickness camera phone.

Figure 3:
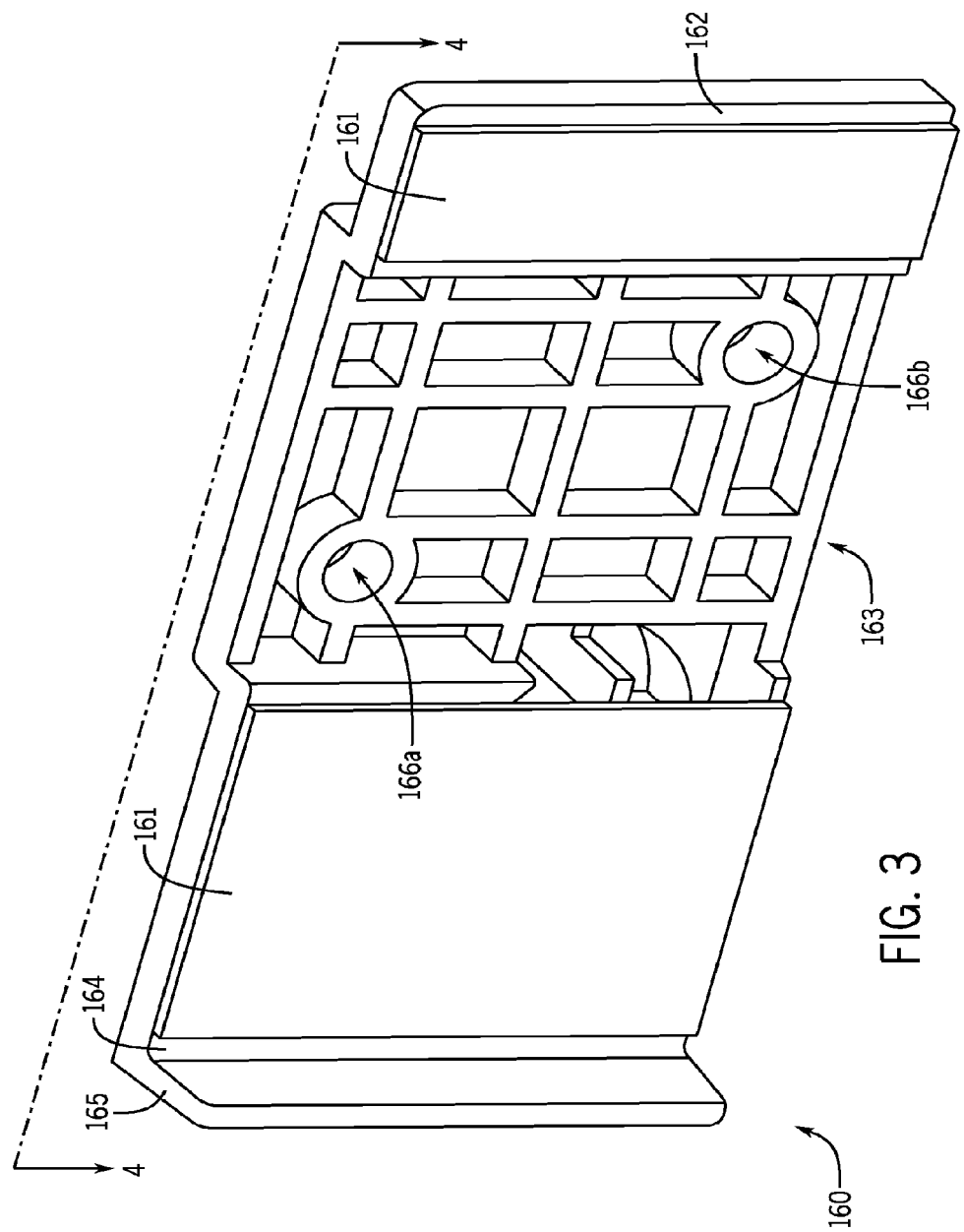
FIG. 3 is an isometric view of the camera phone bracket of the universal camera phone mount shown in the camera phone attachment assembly of FIG. 1.
Figure 4:
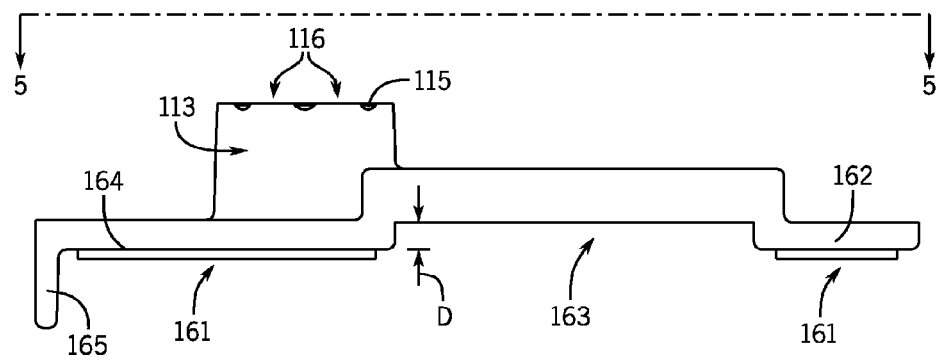
FIG. 4 is a top down view of the camera phone bracket of the universal camera phone mount of FIG. 3, taken along line 4-4 of FIG. 3.
Figure 5:
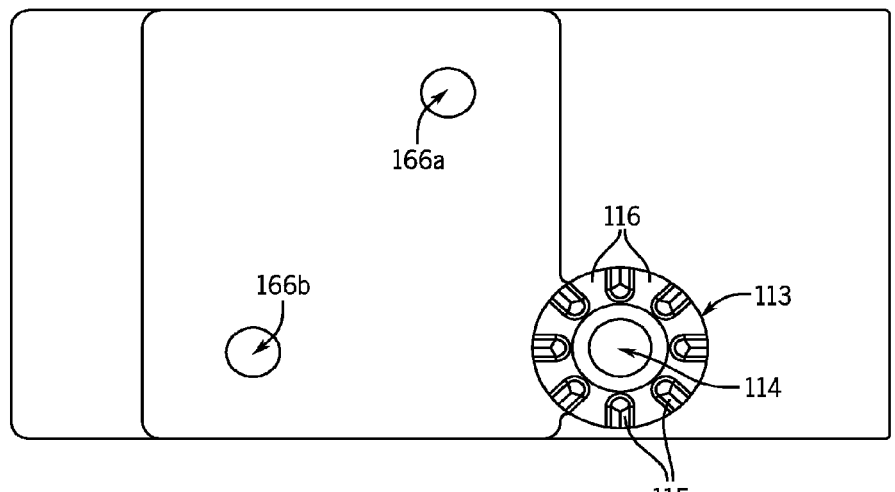
FIG. 5 is a rear view of the camera phone bracket of the universal camera phone mount of FIG. 3, taken along line 5-5 of FIG. 4.

Referring to FIGS. 3, 4, and 5, camera phone bracket 160 is illustrated. Camera phone bracket 160 may include a first planar portion 162 and a second planar portion 164. The surfaces of first and second planar portions 162, 164 are provided in the same plane. A compression pad 161 may be provided over a portion of the planar surface of first and second planar portions 162, 164. A depression portion 163 separates first and second planar portions 162, 164. Depression portion 163 has a depth D which correlates with a thickness T of first and second camera phone clamps 170*a*, 170*b* (shown in FIG. 9). Specifically, depression portion 163 is adapted to receive a retention portion 172 of opposing first and second camera phone clamps 170*a*, 170*b*. When received, the L-shaped retention portions 172 of opposing first and second camera phone clamps 170*a*, 170*b* interconnect, forming a continuous plane between the first second planar portion 162, the first and second camera phone clamps 170*a*, 170*b*, and the second planar portion 164 (see FIG. 16). A lip 165 is provided at an end of second planar portion 164. Lip 165 is preferably transverse or perpendicular to second planar portion 164. Camera phone clamp retention apertures 166*a*, 166*b* may be provided through camera phone bracket 160, and more specifically through depression portion 163. Referring back to FIG. 2, apertures 166*a*, 166*b* may respectively receive thumb screws 167*a*, 167*b*. Upon passage through apertures 166*a*, 166*b*, each thumb screw 167*a*, 167*b* passes through an elongated slot 174a, 174b of the respective first and second camera phone clamps 170a, 170b. Thumb screws 167a, 167b then each engage and is received by an associated tab base nut 168a, 168b. Tab base nuts 168a, 168b have a base with a radius greater than the opening of slots 174a, 174b. This allows the combination of thumb screws 167a, 167b and tab base nuts 168a, 168b to selectively retain first and second camera phone clamps 170a, 170b in camera phone bracket 160.

Figure 8:
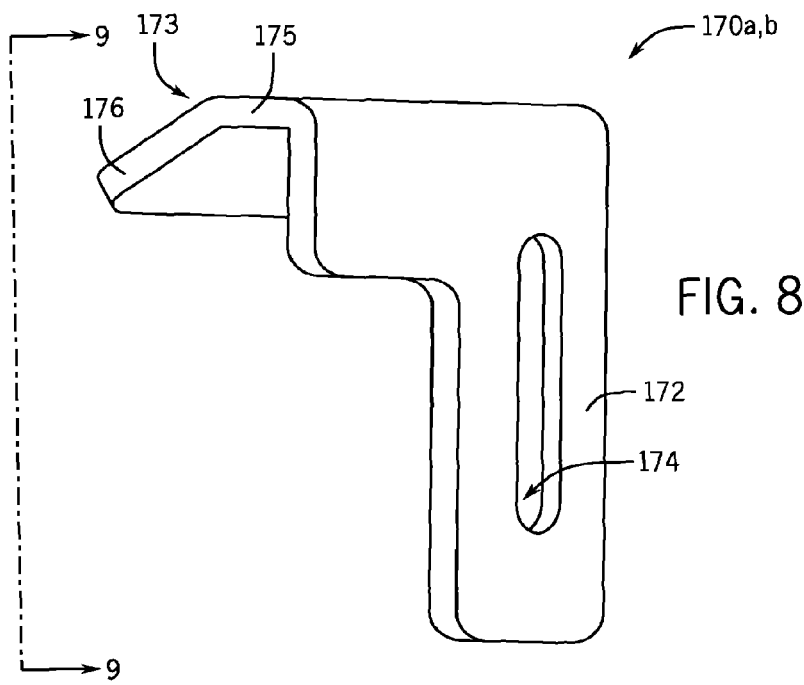
FIG. 8 is an isometric view of the camera phone clamp of the universal camera phone mount shown in the camera phone attachment assembly of FIG. 1.
Figure 9:
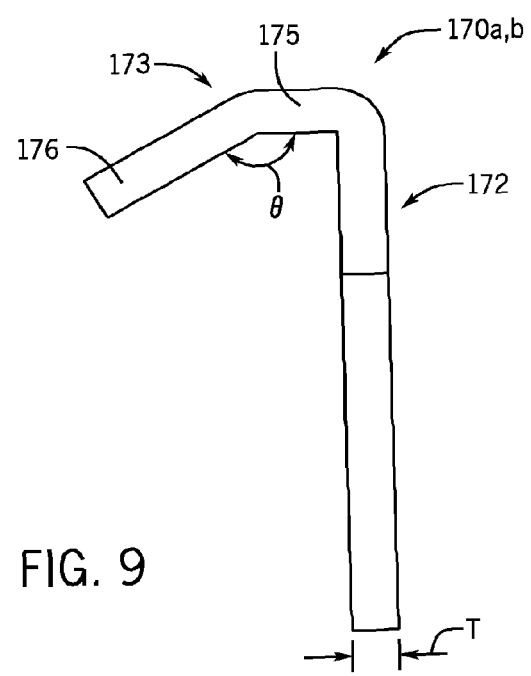
FIG. 9 is a side view of the camera phone clamp of the universal camera phone mount of FIG. 8, taken along line 9-9 of FIG. 8.

Referring to FIGS. 8 and 9, first and second camera phone clamps 170a, 170b are illustrated. First and second camera phone clamps 170a, 170b are identical in shape and components. For use in engagement with camera phone bracket 160, first camera phone clamp 170a is merely rotated one hundred and eighty (180) degrees to second camera phone clamp 170b. Camera phone clamp 170 may include retention portion 172. Retention portion 172 is a substantially planar member having an "L-shape." An elongated slot 174 is provided through retention portion 172. Angled member 173 is coupled to retention portion 172. Angled member 173 may include a first portion 175 and a second portion 176. First portion 175 is provided perpendicular to retention portion 172, while second portion 176 is provided at an angle θ to first portion 175. Preferably, angle θ is an obtuse angle or an angle greater than ninety degrees. Second portion 176 extends from first portion 175 toward retention portion 172. This is to assist in the retention of a camera phone when phone clamps 170 are engaged with camera phone bracket 160, as the second portions 176 of opposing first and second camera phone clamps 170a, 170b will extend towards each other. In effect, the distance between second portions 176 of opposing first and second camera phone clamps 170a, 170b will be less than the distance between first portions 175 of opposing first and second camera phone clamps 170a, 170b.

Figure 6:
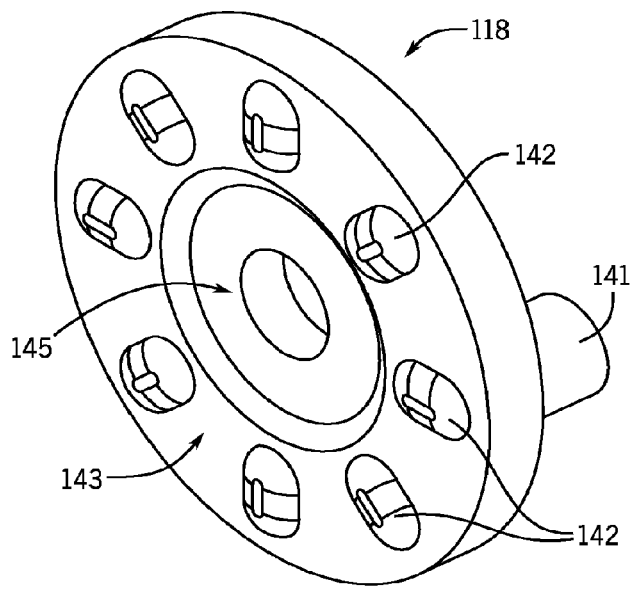
FIG. 6 is an isometric view of a first side of an indexing washer for use in the rotating assembly of the universal camera phone mount of FIG. 3.
Figure 7:
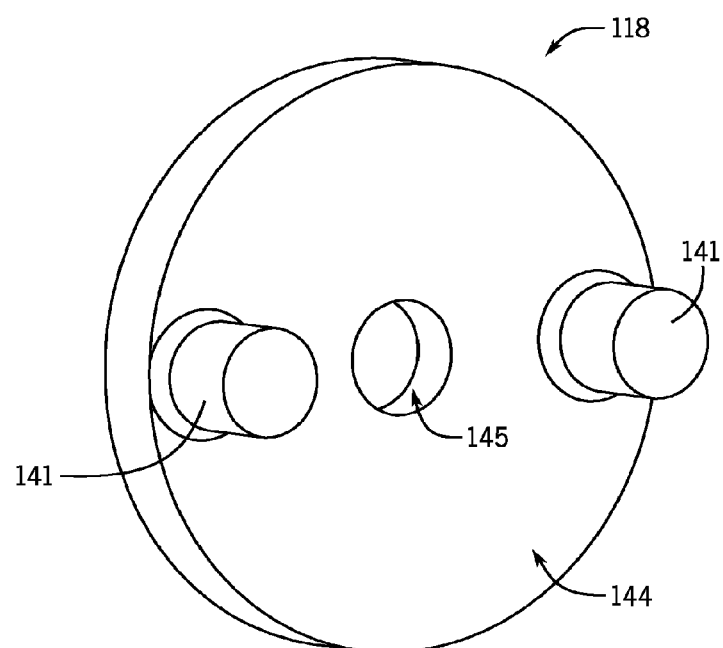
FIG. 7 is an isometric view of a second side of an indexing washer for use in the rotating assembly of the universal camera phone mount of FIG. 3.

Referring back to FIG. 1, universal camera phone mount 110 may also include a rotating assembly or rotating hub assembly 112 for the selective rotation of universal camera phone mount 110. As illustrated in FIGS. 2, 4, and 5, rotating assembly 112 may include a hub 113 provided on camera phone bracket 160. Preferably, hub 113 is provided on the side of camera phone bracket 160 opposite planar portions 162, 164. Hub 113 may include a hub aperture 114 and include a plurality of depressions or lowered portions 115 provided around the perimeter of hub aperture 114. Lowered portions 115 may be separated by unlowered portions 116, such that the lowered and unlowered portions 115, 116 alternate around the perimeter of hub aperture 114. A rivet nut 117 may be received and retained by hub aperture 114. A shoulder bolt 119 mates and is received by rivet nut 117. Shoulder bolt 119 may first be received by washers 111 and an indexing washer 118. As illustrated in FIG. 1, shoulder bolt 119 may be received by washer 111b, an elongated slot 124 provided in the mount bracket 120 (see FIGS. 1 and 2), spring washer 111a, and indexing washer 118 before engagement with rivet nut 117. Referring to FIGS. 6 and 7, indexing washer 118 preferably has a plurality of raised portions 142 on a first side 143 provided about the perimeter of a central hole 145 which corresponds to and mates with the lowered portions 115 provided on hub 113. In addition, indexing washer 118 may include a plurality of raised members 141 provided on a second side 144. The raised members 141 are received in elongated slot 124 provided in the mount bracket 120 (see FIGS. 1 and 2). Accordingly, the engagement of the raised members 141 of the indexing washer 118 in the elongated slot 124 maintains the indexing washer 118 in a single position. However, hub 113 may rotate about indexing washer 118, enabling the attached universal camera phone mount 110 to rotate about indexing washer 118 and mount bracket 120 to a variety of positions. Preferably, hub 113 may ratchet or click or index while rotating about indexing washer 118, as the plurality of raised portions 142 on the first side 143 of indexing washer 118 will engage different and separate lowered portions 115 of hub 113. This allows for selective rotation of universal camera phone mount 110 about hub 113, while also assisting in the retention of the preset position of the hub 113, and associated camera phone bracket 160 in relation to the indexing washer 118. Universal camera phone mount 110 may be rotated about hub 113 to a plurality of positions. The plurality of positions may be dependent upon the number of lowered portions 115 provided around the perimeter of hub aperture 114 and which selectively receive raised members 141 of indexing washer 118.

Figure 11:
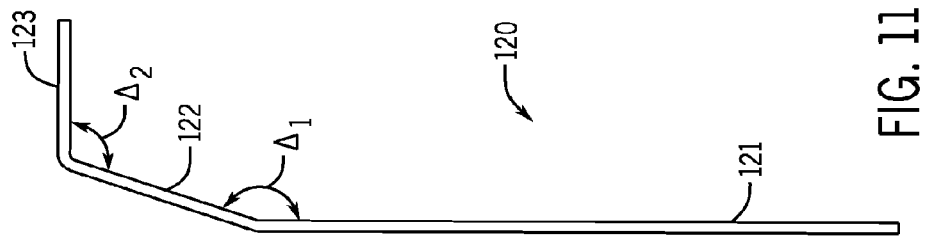
FIG. 11 is a top down view of the mount bracket of FIG. 10, taken along line 11-11 of FIG. 10.
Figure 10:
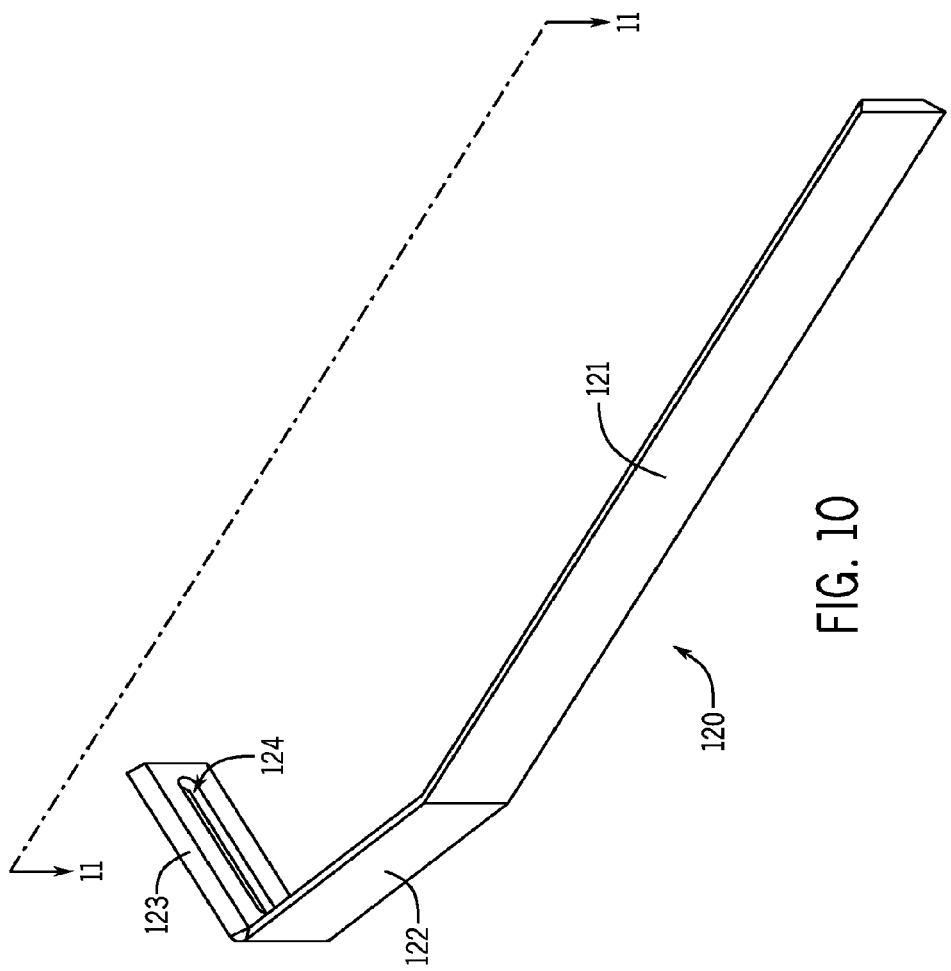
FIG. 10 is an isometric view of a mount bracket of the camera phone attachment assembly of FIG. 1.

FIGS. 10 and 11 illustrate the mount bracket 120. Mount bracket 120 may include a first elongated member 121 coupled to a second elongated member 122. Second elongated member 122 may be coupled to third elongated member 123. Elongated slot 124 may be provided through third elongated member 123. Generally, first elongated member 121 and third elongated member 123 are provided at a right angle or are orthogonal to one another. Second elongated member 122 provides a gradual offset between first and third elongated members 121, 123. A first angle $\Delta_1$ may be formed between first and second elongated members 121, 122. First angle $\Delta_1$ may be obtuse or greater than ninety degrees. A second angle $\Delta_2$ may be formed between second and third elongated members 122, 123. Second angle $\Delta_2$ may be obtuse or greater than ninety degrees.

Scope mount clamp assembly 130 may include at least one clamp 132. Mount bracket 120 is slidably received by one or more clamps 132 of scope mount clamp assembly 130. As illustrated in FIGS. 1 and 2, scope mount clamp assembly 130 may include a plurality of clamps 132. More specifically, scope mount clamp assembly 130 may include two clamps 132. Clamps 132 of scope mount clamp assembly 130 are substantially identical. Each clamp 132 defines a passage or orifice 134 adapted to receive a portion of a scope. Each clamp 132 includes opposing first and second portions 135, 136. First and second portions 135, 136 have a portion which is arcuate in shape and defines approximately half of passage 134. First and second portions 135, 136 are coupled together by at least one connection member 137. Connection members 137 are removable to enable the first and second portions 135, 136 to be separated and subsequently positioned about the outer perimeter of a portion of a scope. Once positioned about the outer perimeter of a portion of the scope, connection members 137 may be reinserted into first and second portions 135, 136 such that portions 135, 136 are reconnected together, allowing each clamp 132 to engage a portion of the scope. In one or more examples of embodiments, each clamp 132 may be provided on any suitable or desired location of a scope. In addition, in one or more examples of embodiments, each clamp 132 may be provided at any desired proximity to another clamp 132, for example adjacent such that a portion of consecutive clamps 132 is in contact with one another. In one or more examples of embodiments, connection members 137 may be a screw, bolt, or any other suitable connection device suitable for temporarily connecting first and second portions 135, 136.

Each clamp 132 may include a mounting portion 138 having opposing first and second teeth 139a, 139b. Opposing first and second teeth 139a, 139b may receive a portion of mount bracket 120. More specifically, opposing first and second teeth 139a, 139b may form a compression fitting to engage a portion of mount bracket 120. As illustrated, each clamp 132 includes a mounting screw 140 which interconnects first and second teeth 139a, 139b. Mounting screw 140 may be rotated a first direction to tighten screw 140, drawing first and second teeth 139a, 139b towards each other, or rotated in a second direction opposite the first direction to loosed screw 140, allowing first and second teeth 139a, 139b to move away from each other. It should be appreciated that second tooth 139b may be removable from clamp 132, while first tooth 139a may be integrally formed with clamp 132.

Figure 12:
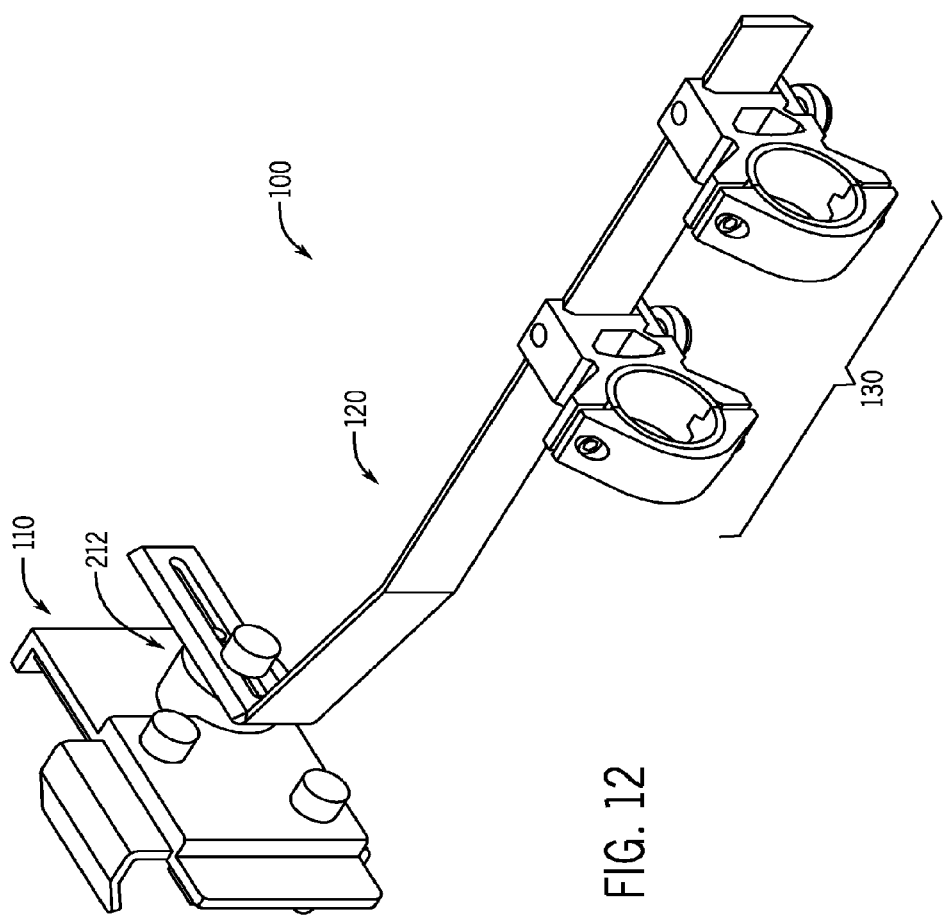
FIG. 12 is an isometric view of an example of an embodiment of camera phone attachment assembly having an alternative example of an embodiment of a rotating assembly in accordance with the disclosure provided herein.
Figure 13:
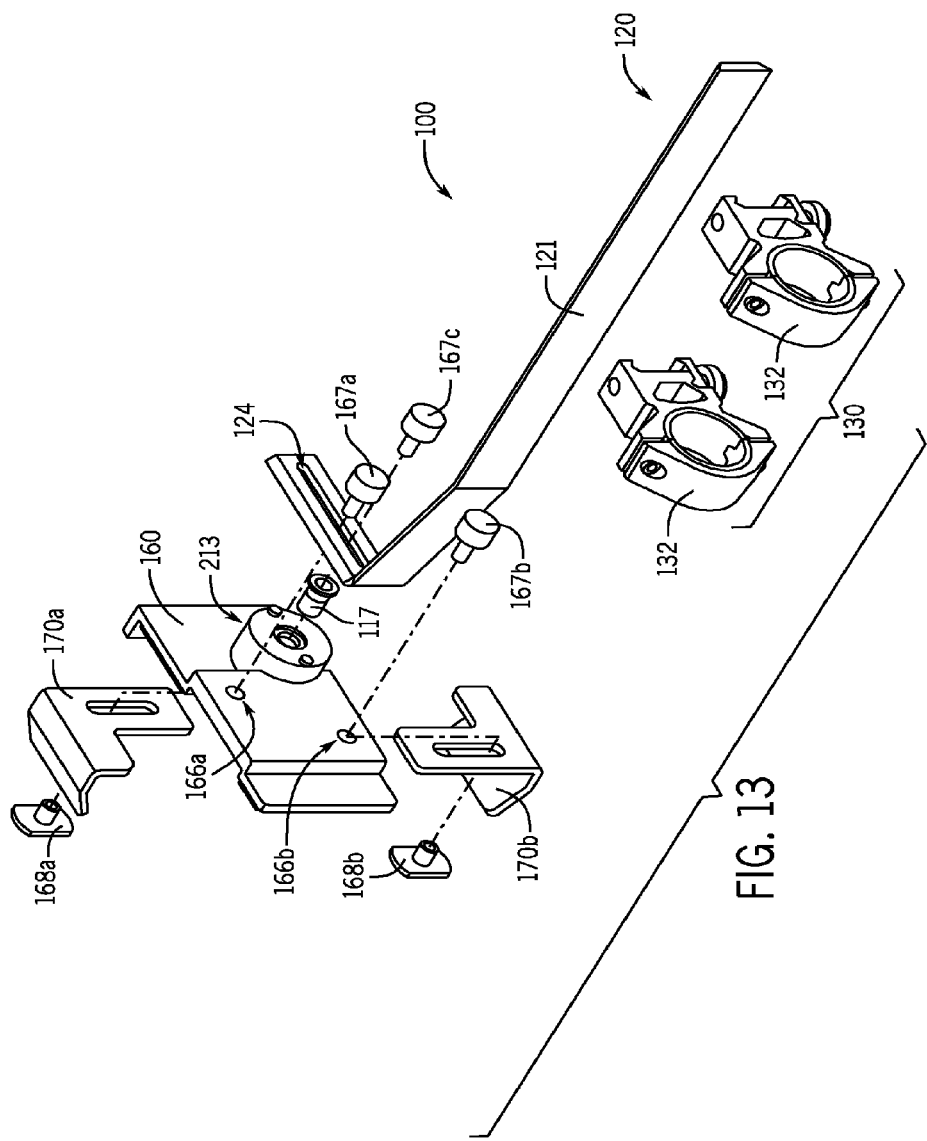
FIG. 13 is an exploded view of the camera phone attachment assembly of FIG. 12.
Figure 14:
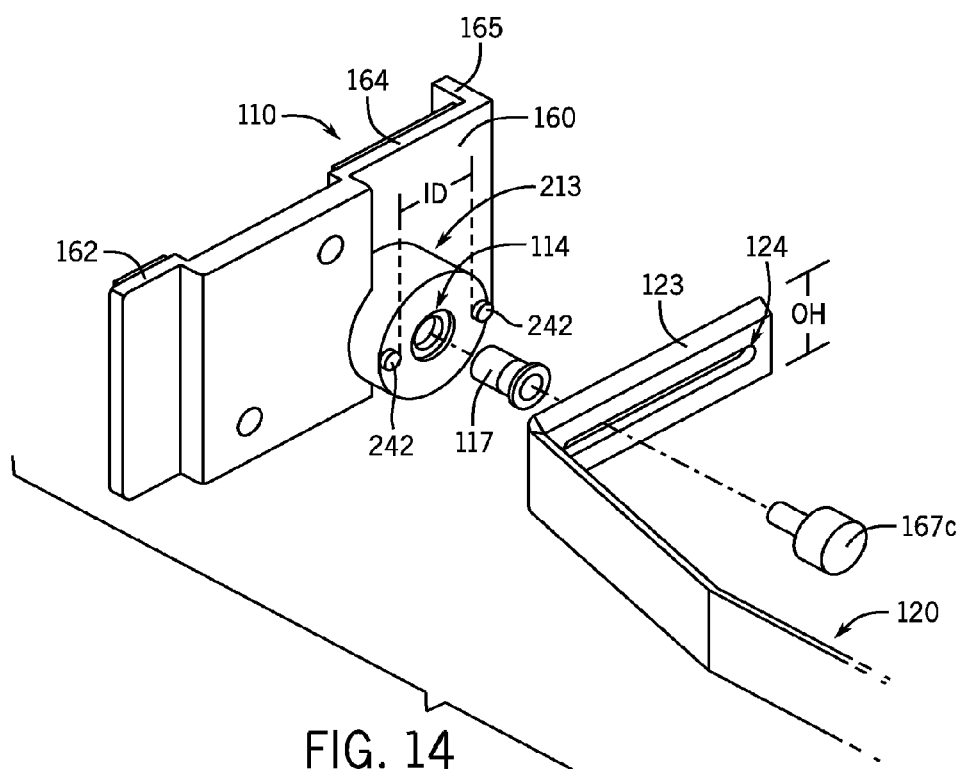
FIG. 14 is a close up view of the universal phone mount and associated alternative example of an embodiment of a rotating assembly of FIG. 12.

An alternative embodiment of the camera phone attachment assembly 100 having a rotating assembly 212 is illustrated in FIGS. 12-14. The alternative embodiment of the camera phone attachment assembly 100 having a rotating assembly 212 includes features which are substantially as described herein in association with camera phone attachment assembly 100. Operation and particular components described herein are substantially the same and like numbers have been used to illustrate the like components. Referring to FIGS. 12-14, in this embodiment, the camera phone attachment assembly 100 includes rotating assembly 212. Rotating assembly 212 includes hub 213 provided on camera phone bracket 160. Hub 213 includes a hub aperture 114 for receiving rivet nut 117. A thumb screw 167c mates with and is received by rivet nut 117. Thumb screw 167c may first be received by elongated slot 124 provided in mount bracket 120. Referring to FIG. 14, hub 213 preferably includes a plurality of raised projections 242. More specifically, hub 213 may include two raised projections 242. Raised projections 242 may be linearly spaced along a diameter of hub 213. In addition, raised projections 242 may be spaced in a plane parallel to first and second planar portions 162, 164 and perpendicular to lip 165. Raised projections 242 may be received by elongated slot 124. In addition, raised projections 242 have an inner distance ID, which extends between the portions of the raised projections 242 closest to hub aperture 114. Inner distance ID has a length or distance which is greater than an outer height OH of third elongated member 123. This allows third elongated member 123 to be optionally received between raised projections 242, and more specifically between inner distance ID. Accordingly, camera phone bracket 160 may engage mount bracket 120 in a first position such that raised projections 242 are received by elongated slot 124, or in a second position such that the outer height OH of third elongated member 123 is received between raised projections 242. In the second position, universal camera phone mount 110 is preferably rotated ninety degrees or perpendicular to the position of universal camera phone mount 110 in the first position. In addition, camera phone bracket 160 may engage mount bracket 120 in a third position, which is ninety degrees or perpendicular to the second position, and in a fourth position which is ninety degrees or perpendicular to the third position. This allows selective alignment of the camera phone received by, attached, and/or retained by universal camera phone mount 110 in relation to the weapon scope. To provide selective positioning of universal camera phone mount 110 between positions, thumb screw 167c may be loosened and removed from rivet nut 117. Camera phone bracket 160 may be manually rotated about hub 213 to the desired first, second, third, or fourth position as discussed herein. Thumb screw 167c may then be tightened to engage rivet nut 117, selectively positioning universal camera phone mount 110 at the desired position.

Figure 15:
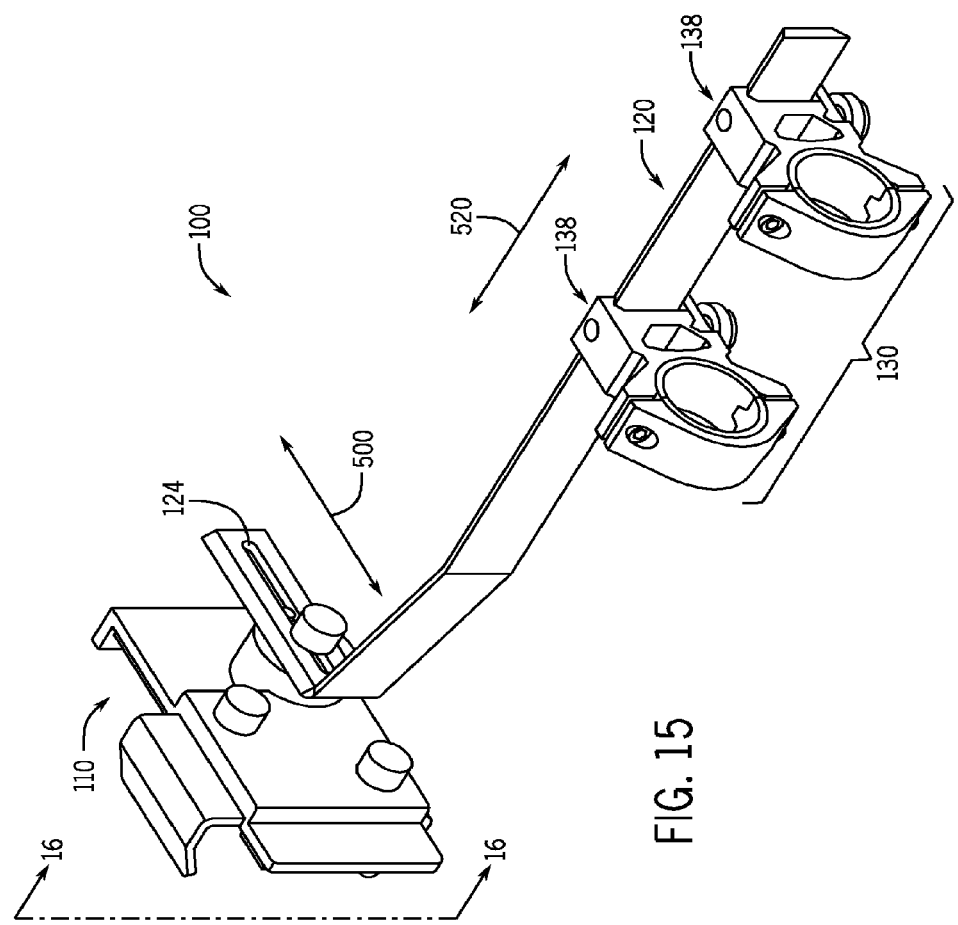
FIG. 15 is an isometric view of one of more examples of embodiments of a camera phone attachment assembly illustrating adjustability in three dimensions.
Figure 16:
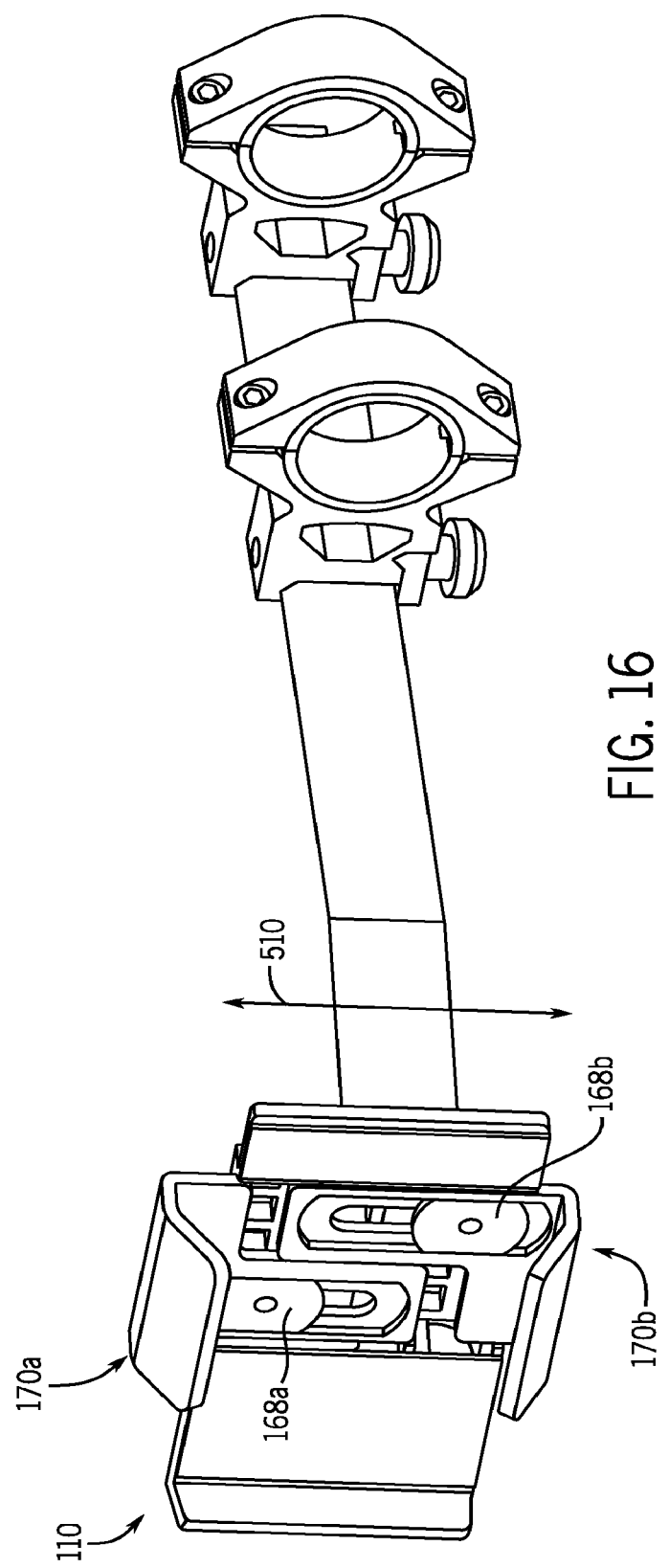
FIG. 16 is an isometric view of one of more examples of embodiments of a camera phone attachment assembly of FIG. 15, taken along line 16-16 of FIG. 15, illustrating adjustability in three dimensions.

Referring to FIGS. 15 and 16, camera phone attachment assembly 100 has adjustability in three separate dimensions to allow for the selective placement of a camera phone which is attached to and retained by universal camera phone mount 110. Referring to FIG. 15, camera phone attachment assembly 100 has adjustability in a first dimension or first plane or a first axis or an x-axis 500. More specifically, universal camera phone mount 110 may be moved along first axis 500 through the selective placement or lateral adjustability through elongated slot 124 of mount bracket 120. Shoulder bolt 119 or thumb screw 167c may be loosened from the associated hub 113, 213 of camera phone bracket 160. Universal camera phone mount 110 may then be moved or laterally slid along elongated slot 124 in first axis 500. When positioned in a desired location, shoulder bolt 119 or thumb screw 167c may be tightened into the associated hub 113, 213 of camera phone bracket 160, selectively placing a camera phone retained by universal camera phone mount 110 in the desired location in first axis 500.

Referring to FIG. 16, camera phone attachment assembly 100 has adjustability in a second dimension or second plane or a second axis or a y-axis 510. More specifically, the phone clamps 170a, 170b may be moved along second axis 510 through the selective placement or lateral adjustability of elongated slots 174a, 174b of each phone clamp 170a, 170b. Thumb screws 167a, 167b may be loosened from the associated tab base nut 168a, 168b of each phone clamps 170a, 170b. Each phone clamps 170a, 170b may then be moved or laterally slid along or adjusted along each respective elongated slot 174a, 174b in second axis 510. When positioned in a desired location, thumb screws 167a, 167b may be tightened into the associated tab base nut 168a, 168b of each phone clamps 170a, 170b, selectively placing a camera phone retained by universal camera phone mount 110 in the desired location in second axis 510.

Referring back to FIG. 15, camera phone attachment assembly 100 has adjustability in a third dimension or third plane or a third axis or a z-axis 520. More specifically, mount bracket 120 may be moved along third axis 520 through the selective placement or lateral adjustability through the mounting portions 138 of one or more clamps 132 of scope mount clamp assembly 130. Opposing first and second teeth 139a, 139b of each clamp 132 may be loosened by rotation of mounting screws 140. Mount bracket 120 may then be moved or laterally slid along third axis 520. When positioned in a desired location, mounting screws 140 may be tightened, pulling first and second teeth 139a, 139b together to selectively retain mount bracket 120, selectively placing mount bracket 120 and a camera phone retained by universal camera phone mount 110 in the desired location in third axis 520. It should be appreciated that third axis 520 is in a plane parallel to scope 300 and/or parallel to the view provided through scope 300. In addition, third axis 520 is in a plane perpendicular to one or more lenses (not shown) provided in scope 300. Second axis 510 is provided perpendicular to third axis 520. Similarly, first axis 500 is provided perpendicular to second axis 510, and first axis 500 is provided perpendicular to third axis 520.

Figure 17:
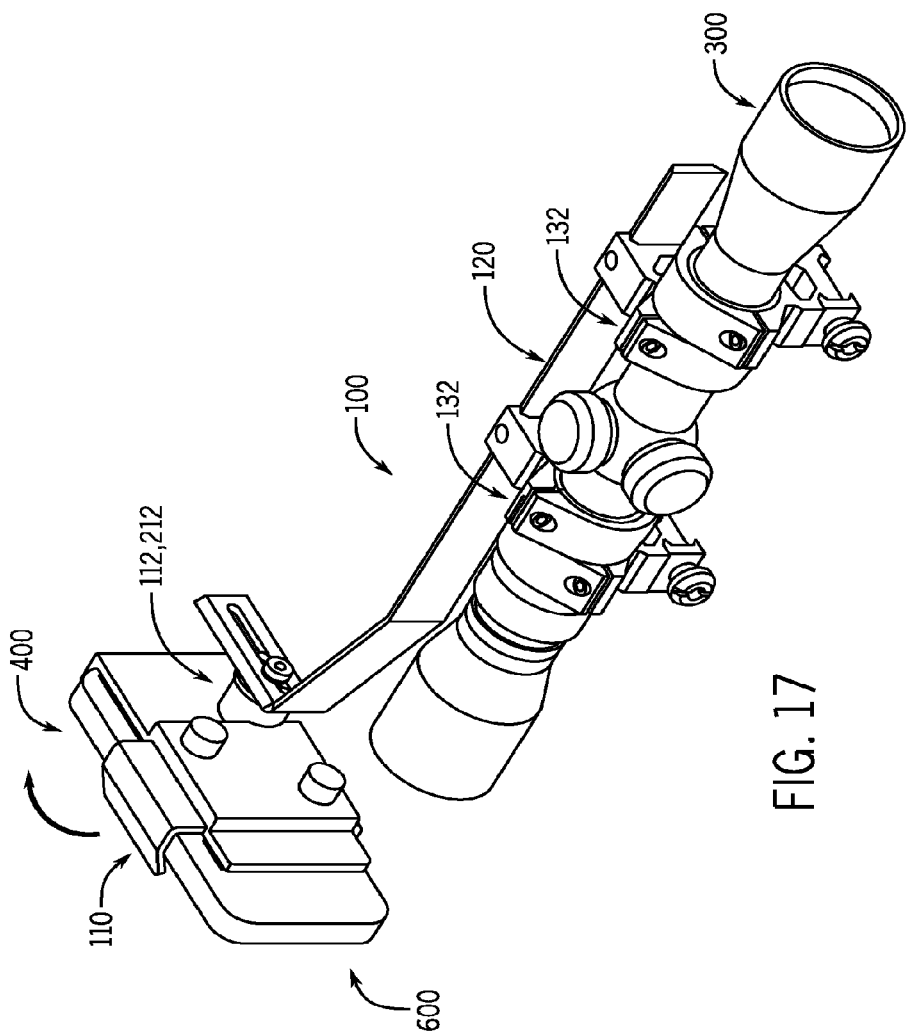
FIG. 17 is an isometric view of one or more examples of embodiments of a camera phone attachment assembly having a camera phone attached thereto and illustrating the camera phone provided in a first position wherein the camera is aligned with a weapon scope.

FIGS. 16 and 17 illustrated one or more examples of embodiments of camera phone attachment assembly 100 connected to a weapon scope 300 and retaining a camera phone 400 connected to universal camera phone mount 110. Referring to FIG. 16, the camera phone 400 is provided in a first position 600, wherein a camera lens provided on the camera phone 400 is in alignment with scope 300, such that camera phone 400 may take still photographs and/or video of the items viewed through scope 300. Referring to FIG. 17, the camera phone 400 is provided in a second position 610, wherein a camera lens provided on the camera phone 400 is not in alignment with scope 300. As illustrated, camera phone 400 in the second position 610 is approximately perpendicular or has been rotated ninety degrees in relation to the first position 600. The rotation has occurred through the selective rotation of universal camera phone mount 110 through rotating assembly 112, 212 in accordance with the disclosure provided herein. In the second position, camera phone 400 may take photographs or video of a broader landscape of activities occurring down range from scope 300. It should be appreciated in one or more examples of embodiments, that camera phone 400 and associated universal camera phone mount 110 may be rotated about rotating assembly 112, 212 in more than two positions. For example, universal camera phone mount 110 may be rotated in any number of suitable positions about rotating assembly 112, 212 in accordance with the disclosure provided herein.

Figure 19:
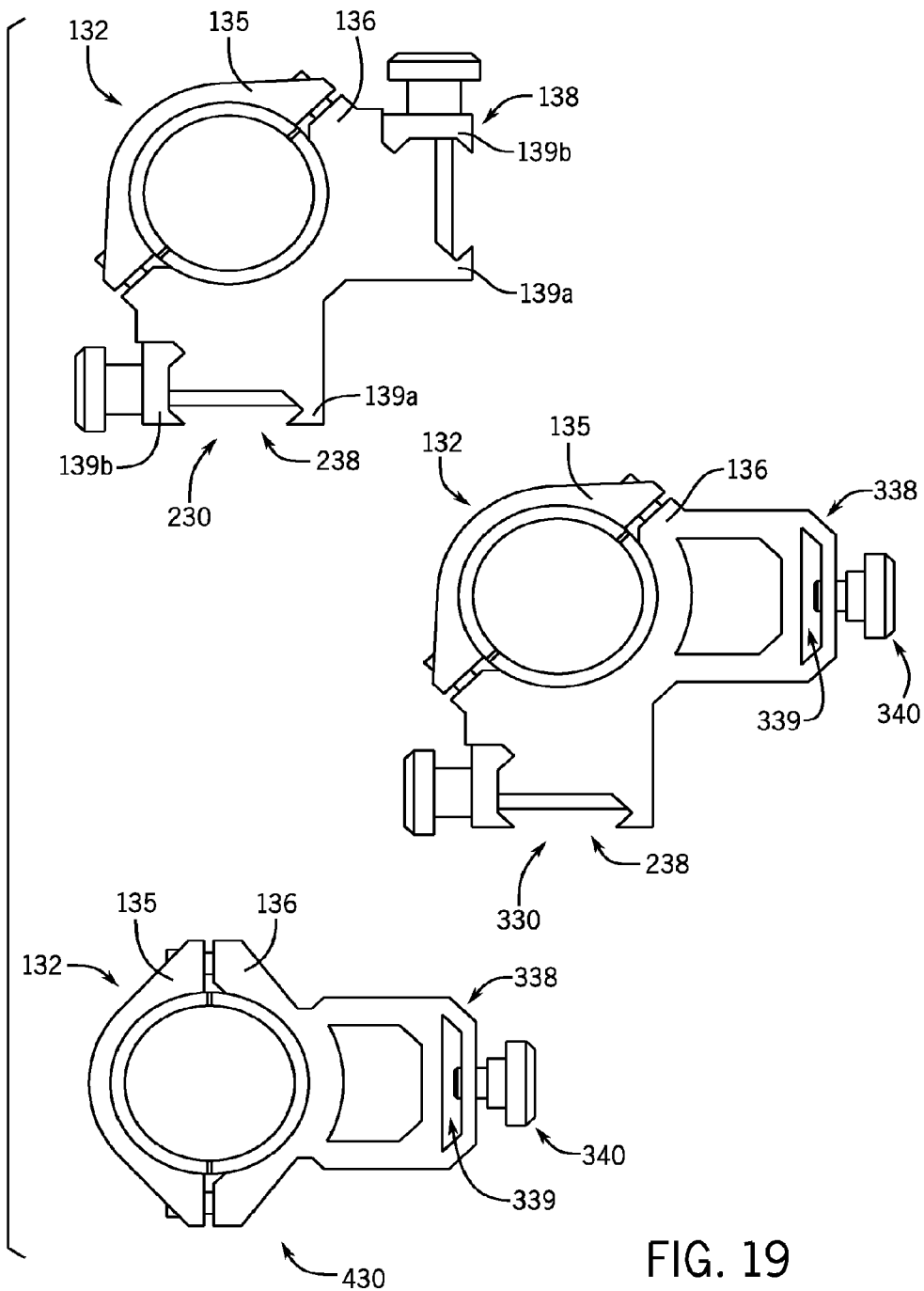
FIG. 19 illustrates an end view of one or more examples of alternative embodiments of scope mount clamp assemblies for use with a camera phone attachment assembly disclosed herein.
Figure 20:
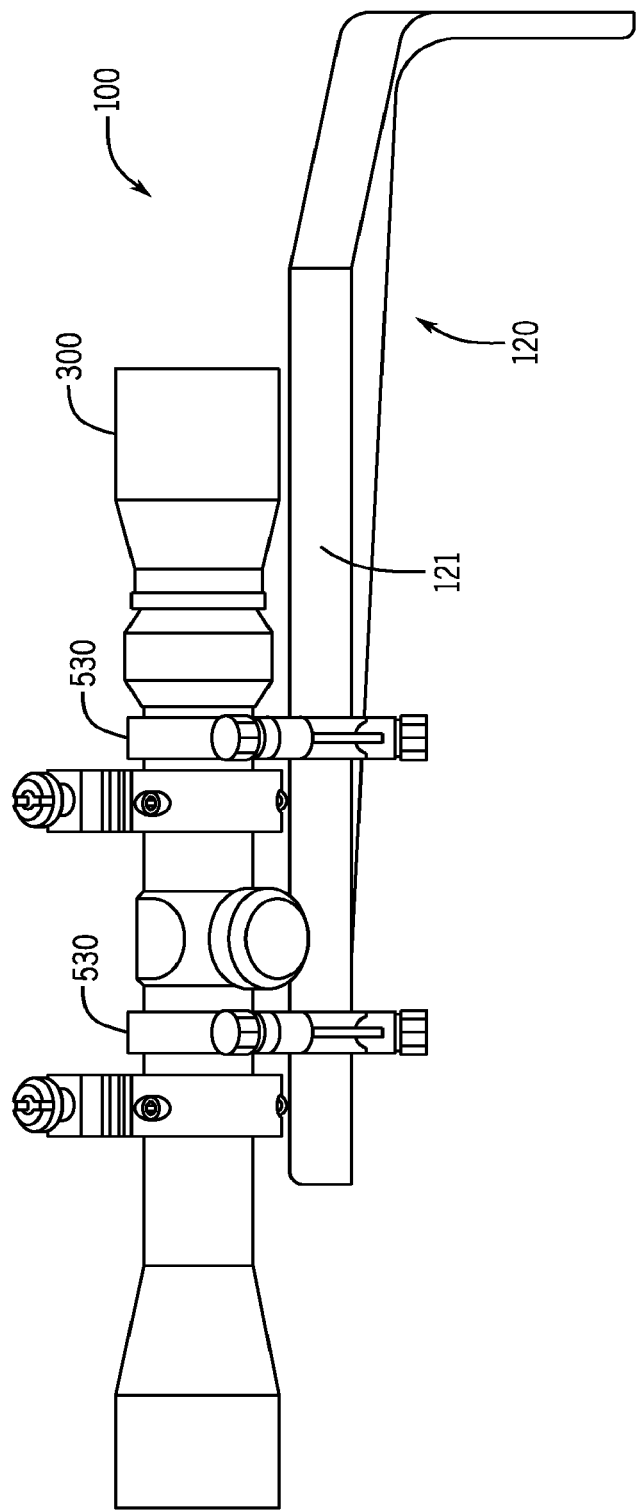
FIG. 20 illustrates a top elevation view of one or more examples of alternative embodiments of scope mount clamp assemblies coupled to a camera phone mount as described herein.
Figure 21:
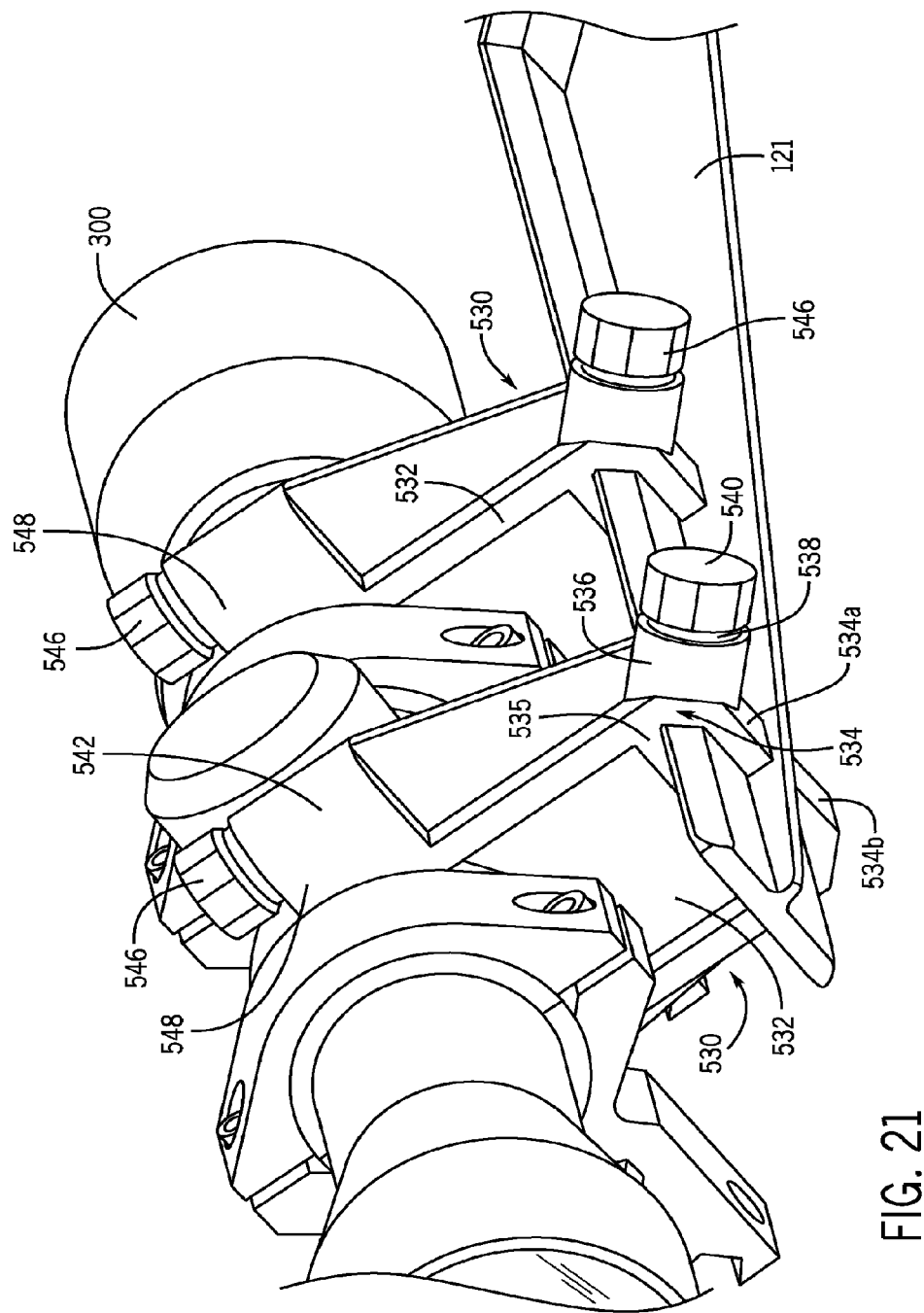
FIG. 21 illustrates a partial perspective view of one or more examples of the scope mount clamp assemblies shown in FIG. 20.
Figure 22:
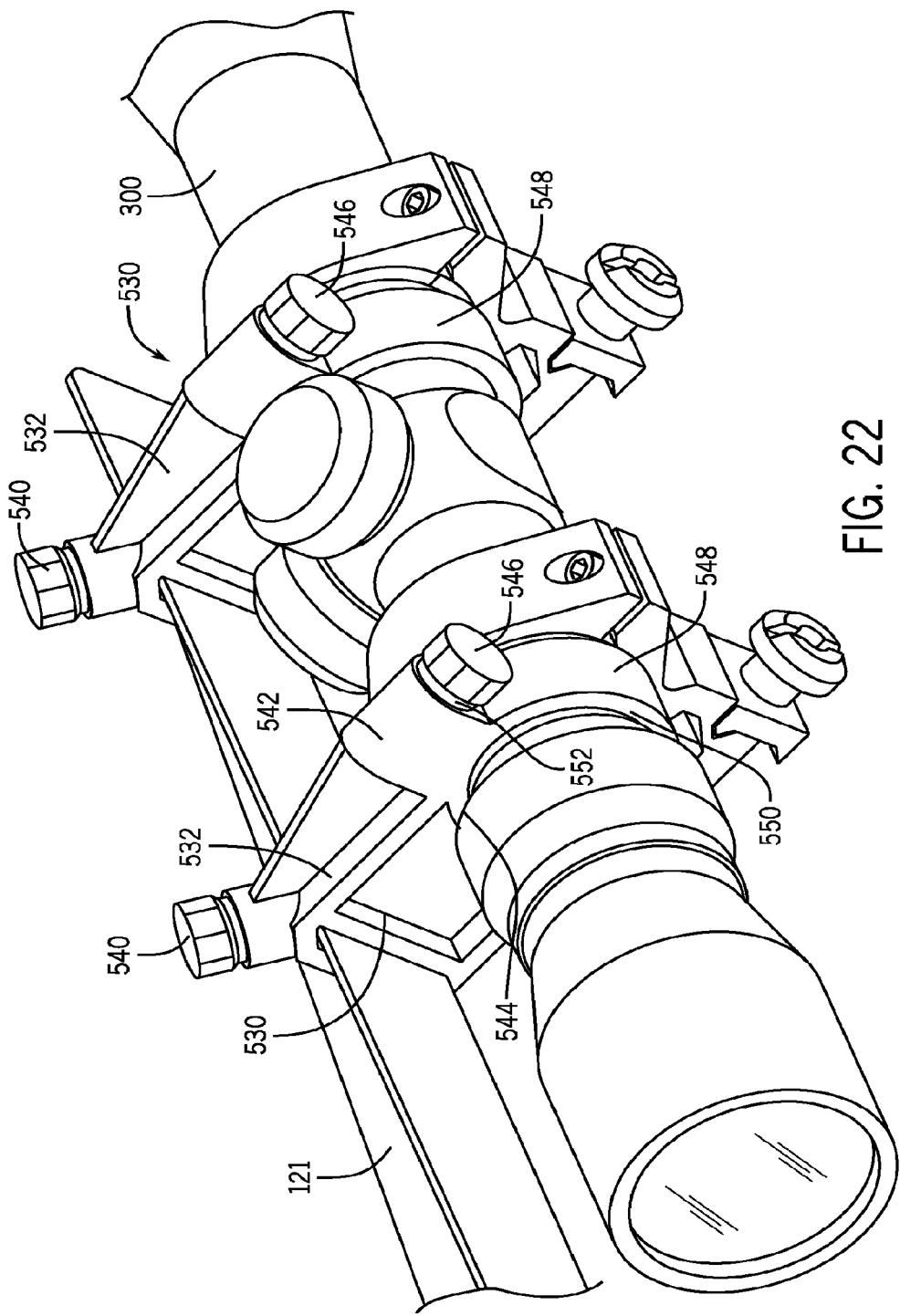
FIG. 22 illustrates a partial perspective view of one or more examples of the scope mount clamp assemblies shown in FIG. 20.
Figure 23:
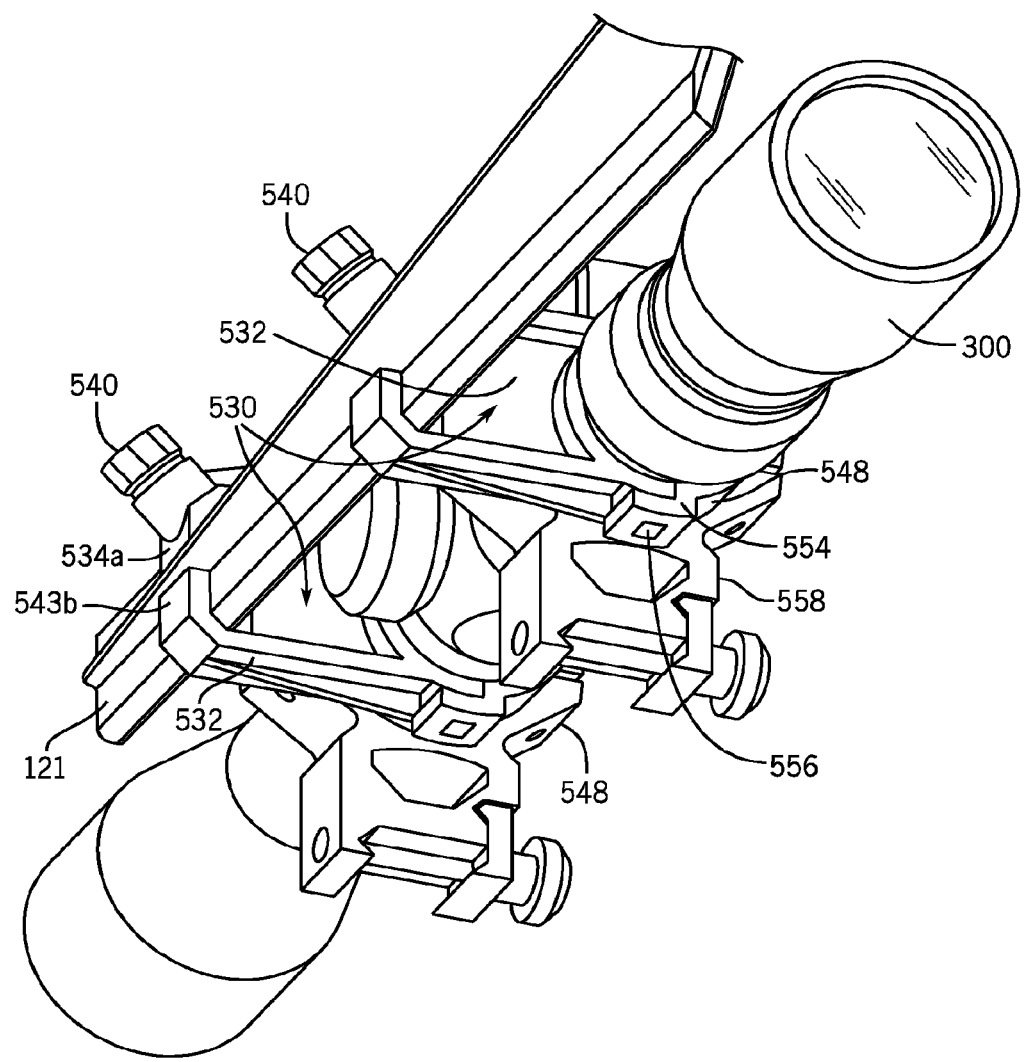
FIG. 23 illustrates a partial perspective view of one or more examples of the scope mount clamp assemblies shown in FIG. 20.
Figure 24:
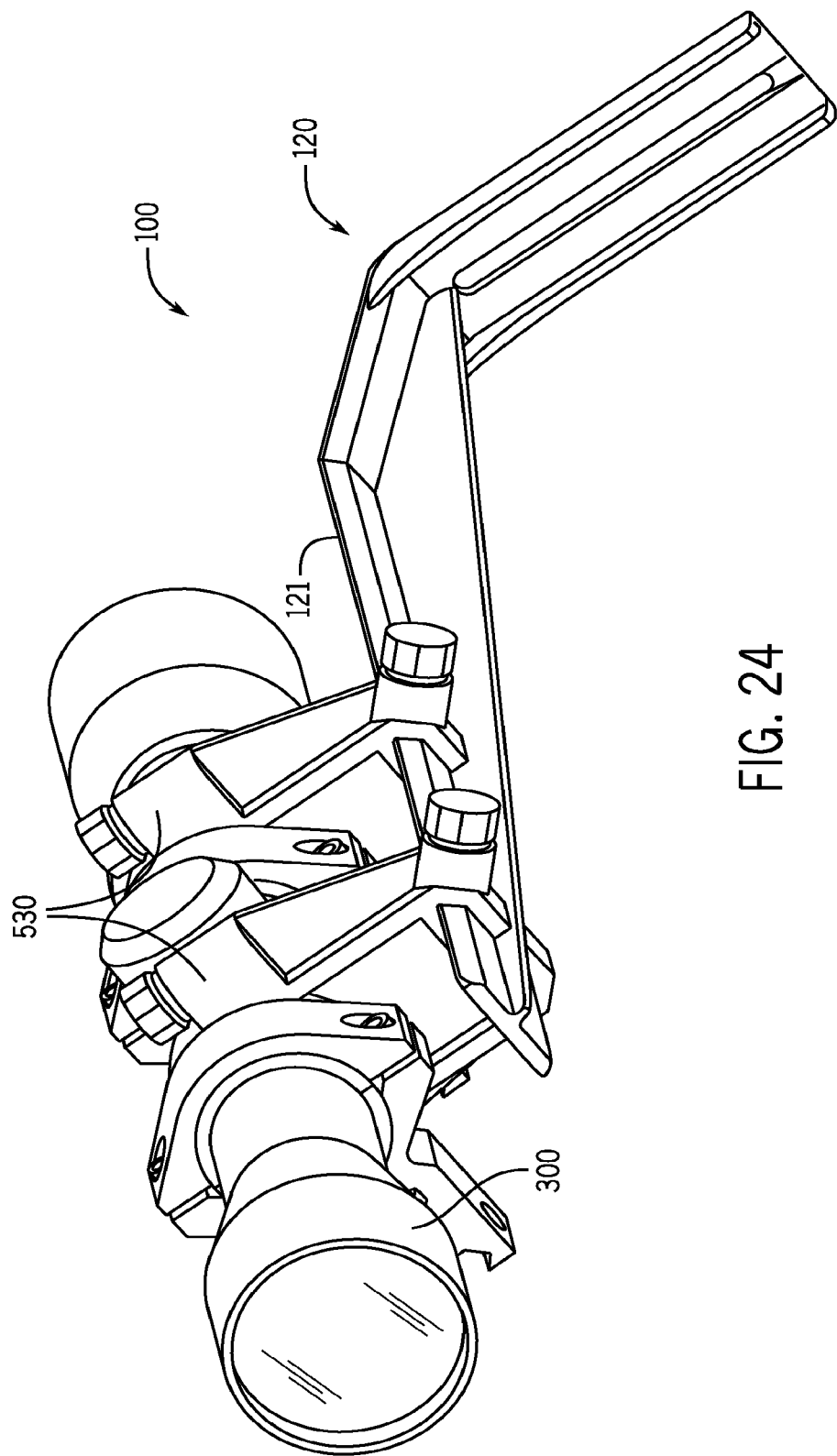
FIG. 24 illustrates a perspective view of one or more examples of the scope mount clamp assemblies shown in FIG. 20.

FIG. 19 illustrates one or more examples of alternative embodiments of scope mount clamp assemblies 230, 330, 430. As illustrated, scope mount clamp assembly 230 may include clamp 132 having first and second portions 135, 136. Scope mount clamp assembly 230 may include a first mounting portion 138 for the selective engagement with a portion of mount bracket 120, and a second mounting portion 238 for the selective engagement with a portion of an associated weapon. Second mounting portion 238 may be substantially the same as first mounting portion 138, however positioned such that the opposing first and second teeth 139a, 139b of the first and second mounting portions 138, 238 are perpendicular to each other.

Scope mount clamp assembly 330 may include second mounting portion 238 for the selective engagement with a portion of an associated weapon, and a third mounting portion 338 for the selective engagement with a portion of mount bracket 120. Third mounting portion 338 may define a passage 339 for slidably receiving a portion of mount bracket 120. Once inserted into passage 339, a mounting screw 340 may be tightened into passage 339 and against a portion of mount bracket 120 to assist in retaining mount bracket 120 within passage 339. In one or more examples of embodiments, passage 339 may have a cross-sectional shape of trapezoidal, rectangular, circular, or any suitable or desired shape applicable for the selective retention of mount bracket 120.

Scope mount clamp assembly 430 may include only third mounting portion 338 for the selective engagement with a portion of mount bracket 120.

Figure 18:
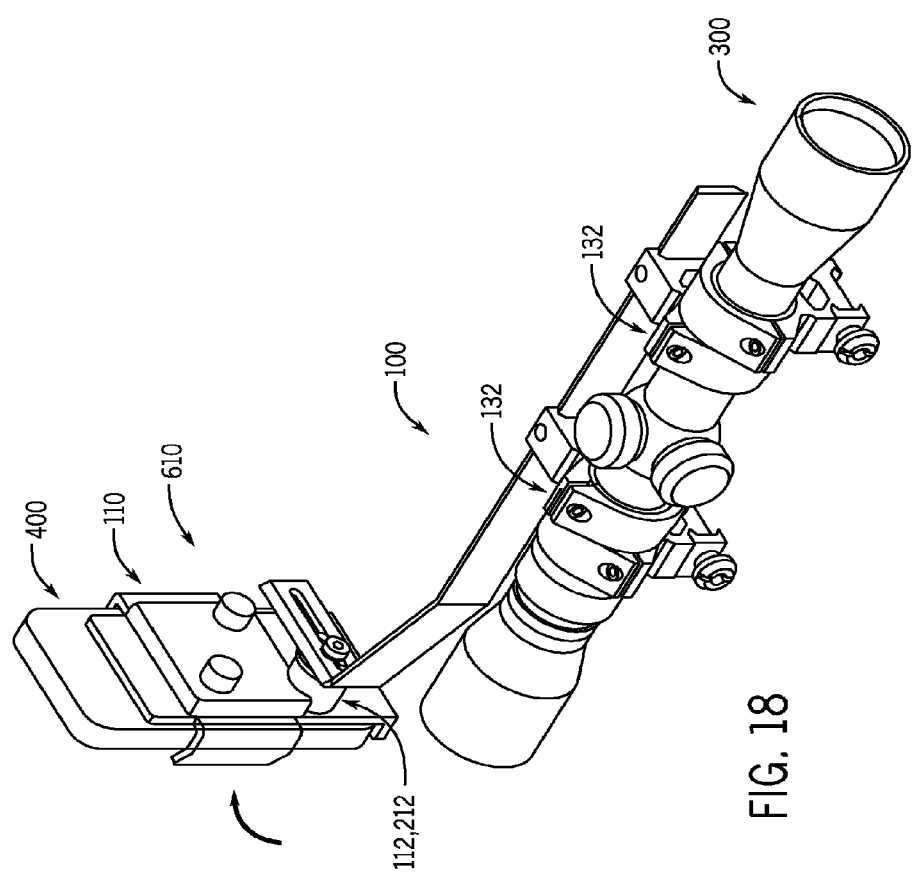
FIG. 18 is an isometric view of one or more examples of embodiments of a camera phone attachment assembly having a camera phone attached thereto and illustrating the camera phone provided in a second position perpendicular to the first position, wherein the camera is not aligned with a weapon scope.

It should be appreciated that scope mount clamp assemblies 230, 330 advantageously eliminate additional mount for mounting a scope to a weapon. As illustrated in FIGS. 17 and 18, separate mounts are necessary to mount scope 300 to a weapon and to mount camera phone attachment assembly 100 to scope 300. Scope mount clamp assemblies 230, 330 advantageously combine attachment of scope 300 to a weapon and mount camera phone attachment assembly 100 to scope 300.

Referring to FIGS. 20-24, a further alternative example of embodiments of a clamp assembly 530 for a scope mount and camera phone mount is illustrated. As can be seen, the scope may be mounted to a weapon as previously described. Clamp(s) 530 in the illustrated embodiment are used to couple the scope 300 and camera phone mount 100.

In the illustrated example, clamp 530 includes first and second portions 532, 548 formed by a spacer block 532 and scope securing member 548. As previously described, a plurality of clamps or mounting brackets may be used with a weapon. Each clamp 530 spacer block 532 has a camera phone mount coupling or mounting portion 534 at an end 535 thereof. Coupling 534 is formed of a recessed area with two integral flanges 534a, 534b similar in shape to first and second teeth 139a, 139b, and forming a shape which mates with a portion of camera phone mount bracket 120, and in particular elongated member 121. Extending at an angle from an upper portion 536 of the clamp 530 is a threaded throughbore 538 which receives a mounting screw or thumb screw 540. In the illustrated embodiment, the throughbore 538 and thumb screw 540 are positioned at an angle which is perpendicular to a surface of the elongated member 121. The thumb screw 540 extends into and through the throughbore 538 and may be removably pressed against the elongated member 121 so as to frictionally engage or press against the elongated member 121 and retain the clamp 530 in position. At a second end 542 of the spacer block 532 is an approximate semi-circular recess 544 sized to receive a portion of the scope 300. The second end 542 also includes a threaded receptor engaged by an end of an additional mounting screw or thumb screw 546. While specific examples are provided above, variations thereon, such as but not limited to variation in angle or position or shape, may be employed consistent with the purposes of the present invention.

Coupled to the second end 542 is the second portion or scope securing member 548 of the clamp assembly 530. The scope securing member 548 is formed by or includes an approximate semi-circular recess 550 which is sized to receive a portion of the scope 300. The combination of the scope securing member 548 and spacer block 532 recesses 544, 550 forms an aperture which holds the scope 300. The scope securing member 548 also includes an aperture, which may be a threaded aperture 552, through which the thumb screw 546 is inserted. The aperture 552 is aligned with the threaded receptor on the spacer block end such that the thumb screw 546 engages both the spacer block 532 and the scope securing member 548 and removably locks the scope 300 to the clamp 530. The scope securing member 548 also includes an end 554 with a tongue 556 or a groove 558 which mates with a corresponding tongue or groove to secure one end of the scope securing member 548 to the spacer block 532 without a separated fastening device. While specific examples are provided above, variations thereon, such as but not limited to variation in angle or position or shape, may be employed consistent with the purposes of the present invention.

Clamp 530 may be formed of any suitable material by now known or future developed means. For example, the clamp 530 elements may be formed of plastic, metal, and combinations of the foregoing through molding or extrusion. Preferably, clamp 530 is formed of a rigid durable material suitable for use with a weapon.

To attach a clamp 530, the clamp is positioned on mounting bracket 120 elongated member 121 by inserting the member 121 into the opening between the flanges 534a and 534b of the camera coupling 534 on the spacer block 532. The spacer block is rotated into position such that an edge of the elongated member 121 is positioned flush against an interior wall of the recess formed in the camera coupling. Once the spacer block is slid into a suitable position on the elongated member 121 (or the elongated member is moved to a suitable position on the clamp 530), the thumb screw 540 is then rotated to tighten against the elongated member and secure same in position against movement in the clamp.

The scope 300 is inserted into the recess 544 of the spacer block 532. The scope securing member end 554 with the tongue and groove coupling 556, 558 is mated with the corresponding coupling on the spacer block and the member 548 is moved into position with the recess 550 surrounding a portion of the scope. The thumb screw 546 is then tightened to secure the member 548 in place and likewise secure the scope 300 in place. The same action may be employed for each clamp. While specific examples are provided, variations thereon, such as but not limited to variation in the steps or order of steps, may be employed consistent with the purposes of the present invention.

There are several advantages to the camera phone attachment assembly which attaches to a weapon scope disclosed herein. For example, a user may selectively take photos and/or video of the activities occurring through a scope and/or the activities occurring outside of the scope. Thus a user may take photographs or videos of the magnified view through a scope or a broader, landscape view of the activities occurring around what is just magnified through the scope. In addition, the universal camera phone mount is adjustable to connect and retain different types of camera phones, allowing one camera phone attachment assembly to serve a number of camera phones. In addition, a user of the camera phone attachment assembly can position the camera phone to view through the scope, allowing the user to view the contents of through the scope on a screen provided on the camera phone. This allows a user who may have physical restrictions in which the user can not properly use a scope alone, to actually use a scope by viewing the screen of the camera phone. In addition, certain users, like law enforcement or military, may wish to look around corners or obstructions without being placed in harm's way. These certain users may position the weapon and associated scope in harm's way to view around the obstruction, and even discharge the weapon. In addition, the camera phone attachment assembly enables a camera phone to be quickly removed from the camera phone bracket. The camera phone attachment assembly is also adjustable in three axis or planes (i.e. X, Y, and Z axis) in order to allow for desired positioning and/or focus of the camera phone. The camera phone attachment assembly may be made from plastic or aluminum thus is light in weight and does not affect the feel or operation of the weapon in which the camera phone attachment assembly is attached. These and other advantages are realized by the camera phone attachment assembly disclosed herein.

Although various representative examples of embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A clamp assembly for a camera phone attachment to a scope of a weapon comprising:
    a spacer block having a first end coupleable to a camera phone mount and having a recess with first and second flanges that engage a portion of the camera phone mount, and a second end having a recess which receives a portion of a weapon scope; and
    a scope securing member coupled to the spacer block on a first end of the scope securing member by a tongue and groove assembly and on a second end by a thumb screw, the scope securing member receiving a portion of the weapon scope.

2. The clamp assembly of claim 1, further comprising an additional thumb screw which secures the clamp to the camera phone mount.

3. The clamp assembly of claim 1, wherein the camera phone mount has at least one camera phone clamp for the selective retention of a camera phone in the camera phone mount, the camera phone mount being rotatably and slidably coupled to a mount bracket.

4. The clamp assembly of claim 3, wherein the camera phone mount is rotatable between a first position and a second position, wherein the first position has a camera lens of the camera phone in alignment the view through the scope, and the second position has the camera lens of the camera phone outside of alignment from the view through the scope.

5. The clamp assembly of claim 1, wherein the clamp assembly slidably receives a portion of the mount bracket.

* * * * *